UnitedStates Patent Office 3,287,220
Patented Nov. 22, 1966

3,287,220
ANTI-ASTHMATIC COMPOSITION AND
METHODS
Gustav J. Martin, Philadelphia, Pa., assignor to William H. Rorer, Inc., Fort Washington, Pa., a corporation of Pennsylvania
No Drawing. Filed Mar. 12, 1964, Ser. No. 351,522
6 Claims. (Cl. 167—73)

This invention relates to new and useful improvements in an anti-asthmatic-enzyme composition and more particularly to a composition adapted to relieve the various symptoms of asthma and similar respiratory afflictions such as bronchiectasis and emphysema.

It has been known to treat asthma with compositions containing theophylline (a smooth muscle relaxant), ephedrine sulfate (a bronchodilator), and phenobarbital (a sedative). The presence of potassium and calcium glutamates with these three constituents tends to correct the ionic imbalance in the cells of the tracheobronchial tree of asthmatics and to prevent undue loss of potassium ion into the mucous, as well as to reduce cell sensitivity to allergic reactions.

It has now been discovered that the addition of a proteolytic enzyme such as bromelain to such a combination has the unpredictable effect of enhancing the desirable effects of the other ingredients.

While the mechanism of the unexpected effect of a proteolytic enzyme is not yet clearly understood, it seems likely that it is due to modification of tissue permeability at the site of adsorption.

According to the present invention, an oral dosage unit tablet is prepared containing an enterically coated core comprising the proteolytic enzymes and the glutamates surrounded by a coating of the other ingredients. Excipients or lubricants may be added or not added as required by conventional tabletting procedures and processing.

A preferred dosage unit tablet may be constituted as follows:

*Table I*

Enteric coated core: Mg.
    Bromelain _____ 10
    Calcium glutamate _____ 175
    Potassium glutamate _____ 75
Outer layers:
    Theophylline _____ 62.5
    Ephedrine sulfate _____ 12.5
    Phenobarbital _____ 5.0
        plus conventional additions.
    Among acceptable alternates may be mentioned:
        For the muscle relaxant theophylline:
            Aminophylline, theobromine, their salts and mixtures;
        For the bronchiodilator ephedrine sulfate:
            Pseudoephedrine, racephedrine;
        For the sedative phenobarbital:
            Butabarbital, mephobarbital, pentabarbital, amobarbital;
        For the proteolytic enzyme bromelain:
            Trypsin, chymotrypsin.

The dosage range with the preferred tablets described is not critical but will depend on the condition and response of the patient. The range, for example, may be 4–12 tablets per day per patient. The individual components within the tablet may vary relative to each other between the minimum and maximum ratios of Table II.

In terms of the individual ingredients, minimum and maximum recommended doses per day are given in the following table:

*Table II*

| | Minimum, mg. | Maximum, mg. |
|---|---|---|
| Theophylline | 250 | 1,000 |
| Ephedrine sulfate | 50 | 200 |
| Phenobarbital | 20 | 80 |
| Bromelain | 40 | 160 |
| Calcium glutamate | 700 | 2,800 |
| Potassium glutamate | 300 | 1,200 |

In most cases a desirable dose is 2–2.5 times the above minimum dose.

The composition of this invention is indicated in the treatment of respiratory diseases involving edema and spasm of the bronchial tree, such as acute and chronic asthma, bronchiectasis and emphysema but is contraindicated under certain conditions.

Since the ingredients of our composition have long been studied pharmacologically, the question of their toxicity is not thought to be critical. However, extensive acute and chronic toxicity tests were carried out on mice, rats and guinea pigs with the present composition and with the present composition, less bromelain. In all cases, the LD50 was many times the maximum recommended human dose, so that a safe therapeutic index is assured.

The enhancing effect of bromelain in the present composition becomes evident at moderate dosage levels acting for a period of 5 hours as indicated by the following test. Guinea pigs were subjected to the aerosol administration of histamine which induced coughs in the animals. The composition of the present invention (Table I) was then administered orally to one group, a similar composition without bromelain to a second group, and bromelain alone to a third group. The dosage in each case was one-half the recommended maximum human dose (Table II). The percentage inhibition of cough in each group was observed at the end of one, three and five hours. The results are shown in the following table:

*Table III*

| Agent | No. of Animals | Percent Inhibition of cough | | |
|---|---|---|---|---|
| | | 1 hour | 3 hours | 5 hours |
| New product less bromelain | 72 | 51 | 46 | 37 |
| Bromelain only | 36 | 21 | 29 | 16 |
| New product | 36 | 59 | 70 | 64 |

From this data it will be seen that under the test conditions (1) the product of the present invention gave maximum protection for all three periods of observation (59%, 70% and 64%), (2) that the protection afforded by the present product without bromelain and by bromelain alone wore off as time progressed up to 5 hours, (3) that the percentage inhibition afforded by the present invention at the end of 5 hours was greater than that afforded either by the product without bromelain or by bromelain alone for any period up to 5 hours, and (4) that the percentage protection afforded by the present product after 5 hours was greater than the sum of the percentages of protection afforded by the product without bromelain plus that afforded by bromelain alone. The presence of bromelain in the new composition is outstanding in extending the period of active protection of a single dose and the enhancing action of bromelain becomes evident as time progresses.

The composition of this invention has been used in clinical trials with considerable success. 93 patients suffering from chronic bronchial asthma, bronchiectasis or emphysema were treated for 8 months at a dosage rate of 4–8 tablets (Table I) per day. Results classed as good or excellent, based on subjective and objective responses were observed in 60% of the cases. No untoward side effects attributable to the present composition were encountered.

From the above disclosure it will be seen that the novel compositions of this invention constitute a safe and uniquely effective means for treating respiratory disease involving edema and spasm of the tracheobronchial tree, such as acute and chronic asthma, bronchiectasis and emphysema.

The above described examples are intended to be illustrative only and not to limit the invention, the scope of which is defined in the appended claims.

I claim:
1. A composition adapted to relieve the symptoms of diseases of the tracheobronchial tree comprising by weight 4 to 16 parts bromelain in combination with 2 to 8 parts phenobarbital, 5 to 20 parts ephedrine sulfate, 25 to 100 parts theophylline, 30 to 120 parts potassium glutamate and 70 to 280 parts calcium glutamate.

2. A dosage unit composition adapted to relieve the symptoms of diseases of the tracheobronchial tree constituted of a tablet containing the following ingredients in multiples or submultiples of the indicated amounts:

| | Mg. |
|---|---|
| Bromelain | 10 |
| Calcium glutamate | 175 |
| Potassium glutamate | 75 |
| Theophylline | 62.5 |
| Ephedrine sulfate | 12.5 |
| Phenobarbital | 5.0 | the bromelain and glutamates being present in the tablet in an enterically isolated core.

3. A composition adapted to relieve the symptoms of diseases of the tracheobronchial tree comprising by weight 4 to 16 parts bromelain in combination with 2 to 8 parts of a sedative, 5 to 20 parts of a bronchodilator, 25 to 100 parts of a smooth muscle relaxant and 100 to 400 parts of potassium or calcium glutamate.

4. A tablet of the composition of claim 3 comprising an enteric ore containing said bromelain and said glutamate surrounded by a layer containing said smooth muscle relaxant, said bronchodilator and said sedative.

5. A method of treating tracheobronchial tree disease symptoms comprising oral ingestion by a human suffering from said disease together of pharmaceutically effective amounts of bromelain, potassium or calcium glutamate, a bronchodilator, a smooth muscle relaxant and a sedative.

6. A method of treating tracheobronchial tree disease symptoms comprising oral ingestion by a human suffering from said disease of the composition of claim 3.

No references cited.

JULIAN S. LEVITT, *Primary Examiner.*

M. J. COHEN, *Assistant Examiner.*